US012141765B2

(12) United States Patent
Gupta et al.

(10) Patent No.: US 12,141,765 B2
(45) Date of Patent: Nov. 12, 2024

(54) TRANSACTION NETWORK WITH COMMERCIAL FLEXIBLE INTERCHANGE

(71) Applicant: MASTERCARD INTERNATIONAL INCORPORATED, Purchase, NY (US)

(72) Inventors: Ankush Gupta, New York, NY (US); Srinivasan Chandrasekharan, Princeton, NJ (US); Jeanne B. Moore, Webster Groves, MO (US); John Aprile, Larchmont, NY (US); Farzana Chilwan, New York, NY (US); Brianna Thompson, East Quogue, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 18 days.

(21) Appl. No.: 18/093,108

(22) Filed: Jan. 4, 2023

(65) Prior Publication Data

US 2023/0214794 A1    Jul. 6, 2023

Related U.S. Application Data

(60) Provisional application No. 63/296,823, filed on Jan. 5, 2022.

(51) Int. Cl.
*G06Q 20/02* (2012.01)
*G06Q 20/34* (2012.01)
*G06Q 20/40* (2012.01)

(52) U.S. Cl.
CPC ........... *G06Q 20/027* (2013.01); *G06Q 20/34* (2013.01); *G06Q 20/40* (2013.01)

(58) Field of Classification Search
CPC ....... G06Q 20/027; G06Q 20/34; G06Q 20/40
See application file for complete search history.

(56) References Cited

U.S. PATENT DOCUMENTS

| | | | |
|---|---|---|---|
| 10,762,506 B1 * | 9/2020 | Cash | G06Q 20/206 |
| 10,867,303 B1 * | 12/2020 | Manapat | G06Q 10/067 |
| 10,902,416 B1 * | 1/2021 | McNamara | H04L 67/141 |
| 2020/0184448 A1 * | 6/2020 | Jain | G06Q 20/202 |
| 2021/0295320 A1 * | 9/2021 | Yan | G06Q 20/40 |

* cited by examiner

*Primary Examiner* — Scott C Anderson
(74) *Attorney, Agent, or Firm* — Talem IP Law, LLP (57) ABSTRACT

A method of providing flexibility of an interchange value in card payments via a commercial flexible interchange program includes receiving an authorization request for payment authorization for a transaction from an acquirer. The authorization request includes information of an account of a buyer associated with an issuer and an interchange value. The method further includes, upon determining that the issuer and the acquirer are registered in the commercial flexible interchange program, sending the authorization request for payment authorization for the transaction to the issuer, receiving an authorization response message, and determining whether the authorization response message includes a decline or an authorization for the transaction. In response to determining that the authorization response message includes the decline, passing the authorization response message to the acquirer. In response to determining that the authorization response message includes the authorization, storing the interchange value and sending the authorization response message.

17 Claims, 7 Drawing Sheets

TRANSACTION NETWORK WITH COMMERCIAL FLEXIBLE INTERCHANGE

BACKGROUND

Currently, global commercial spending (e.g., business-to-business transactions) represents approximately $125+ trillion in transactions each year; out of that, only about 2% occurs through existing payment card networks. Currently, an impediment to adoption of commercial payments through existing payment card networks is the cost of acceptance to sellers/suppliers. Indeed, while buyers may benefit from using existing payment card networks (e.g., through extended days payable outstanding), the cost is at least partially absorbed by sellers/suppliers. Due to this, sellers/suppliers generally either allow or proactively seek out alternative forms of payment from buyers (e.g., check, ACH, etc.) that result in or may be perceived to result in lower costs to the sellers/suppliers. However, accepting these alternative forms of payment can be cumbersome for the entities involved (e.g., lack of necessary reconciliation data, more uncertainty around when payment will be received and/or longer days outstanding) and not as secure for either party to the transaction (e.g., cash and/or check) as payments through existing payment card transaction networks.

BRIEF SUMMARY

In a transaction network, a commercial flexible interchange program is provided that enables representatives of buyers and suppliers (e.g., typically issuers and acquirers) to negotiate and agree upon an interchange value that is applied to one or more transactions, and which can be done at an individual transaction level. Advantageously, due to this ability to negotiate and agree upon the interchange value that is applied to a transaction, buyers are able to use payment cards to pay for goods and/or services, suppliers (who otherwise may have resisted accepting card payments) are able to agree to an acceptable total cost of card acceptance, and both buyers and suppliers benefit from the security of payment card transaction networks and the standard reconciliation data provided.

A method of providing flexibility of an interchange value in card payments via a commercial flexible interchange program implemented on an interchange management server associated with a payment card network includes receiving, from an acquirer that is associated with a supplier, an authorization request for payment authorization for a transaction, wherein the authorization request for payment authorization for the transaction includes information of an account of a buyer that is associated with an issuer and an interchange value; determining that the issuer and the acquirer are registered in the commercial flexible interchange program; upon determining that the issuer and the acquirer are registered in the commercial flexible interchange program, sending the authorization request for payment authorization for the transaction to the issuer; receiving, from the issuer, an authorization response message; determining that the authorization response message includes an authorization for the transaction that comprises acceptance of the interchange value for the transaction; in response to determining that the authorization response message includes the authorization for the transaction: storing the interchange value; and sending, to the acquirer, the authorization response message that includes the authorization for the transaction.

In some cases, the method further includes receiving, from the acquirer that is associated with the supplier, a second authorization request for payment authorization for a second transaction, wherein the second authorization request for payment authorization for the second transaction comprises information of a second account of a second buyer that is associated with the issuer and a second interchange value; sending the second authorization request for payment authorization for the second transaction to the issuer; receiving, from the issuer, a second authorization response message; and determining that the second authorization response message includes a decline of the interchange value for the second transaction. In some cases, the second authorization response message includes a decline reason subcode. In some cases, the method further includes in response to determining that the second authorization response message includes the decline of the second interchange value for the transaction, passing the authorization response message that includes the decline of the second interchange value for the second transaction to the acquirer.

In some cases, the method further includes receiving an indication that the issuer desires to participate in the commercial flexible interchange program; and registering the issuer in the commercial flexible interchange program. In some cases, the method further includes receiving an indication that the acquirer desires to participate in the commercial flexible interchange program; and registering the acquirer in the commercial flexible interchange program. In some cases, the method further includes receiving, from the acquirer, a settlement request for the transaction comprising an interchange rate designator (IRD) indicator of the transaction of the commercial flexible interchange program; in response to receiving the settlement request comprising the IRD indicator of the transaction of the commercial flexible interchange program, obtaining the interchange value that was stored in response to determining that the authorization response message includes the authorization; applying the interchange value to the transaction; and settling the transaction.

In some cases, the method described above may be employed by one or more computer-readable storage media storing instructions implemented on an interchange management server associated with a payment card network that when executed by a processor directs the interchange management server to employ the method. In some cases, the method described above may be employed by an interchange management server for providing flexibility of an interchange value in card payments via a commercial flexible interchange program. The interchange management server includes a processor, a storage, and instructions stored on the storage that when executed by the processor directs the interchange management server to employ the method.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3A shows an approval of authorization approval for the transaction and FIG. 3B shows a decline of authorization for the transaction.

DETAILED DESCRIPTION

In a transaction network, a commercial flexible interchange program is provided that enables representatives of buyers and suppliers (e.g., typically issuers and acquirers) to negotiate and agree upon an interchange value that is applied to one or more transactions, and which can be done at an individual transaction level. Advantageously, due to this ability to negotiate and agree upon the interchange value that is applied to the transaction, buyers are able to use payment cards to pay for goods and/or services, suppliers (who otherwise may have resisted accepting card payments) are able to agree to an acceptable total cost of card acceptance, and both buyers and suppliers benefit from the security of payment card transaction networks and the standard reconciliation data provided.

As used herein, information of an account of an entity (e.g., buyer and/or supplier) can include, but is not limited to, a payment card (e.g., physical and/or virtual) number, a name associated with the payment card number, an expiration date associated with the payment card number, and any additional information that may be necessary for authorization and/or settlement of a transaction, including commercial transactions.

As used herein, an interchange value refers to an interchange rate (e.g., percentage fee) and/or interchange amount (e.g., flat fee) or combination of both that is applied to a transaction (e.g., a business-to-business transaction).

Figure 1:
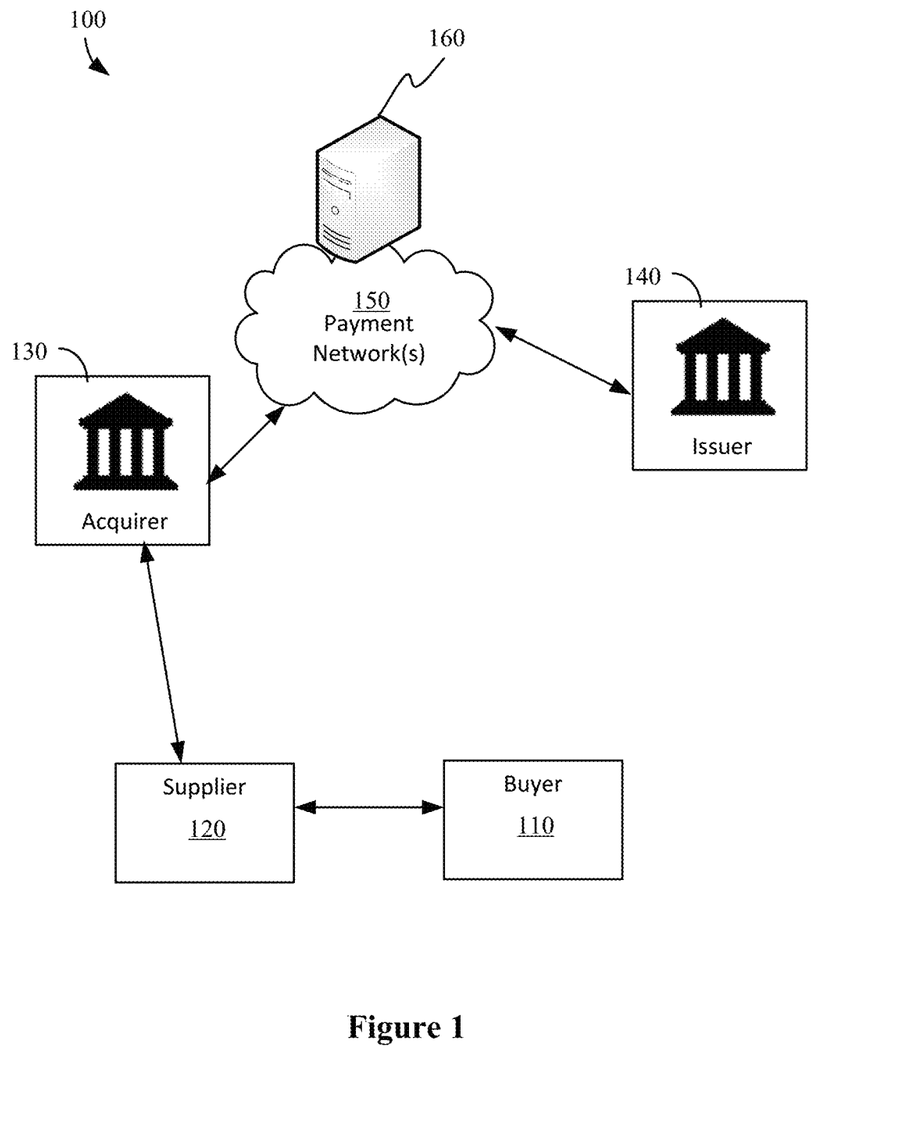
FIG. 1 illustrates an operating environment for a transaction using a commercial flexible interchange program.

FIG. 1 illustrates an operating environment for a transaction using a commercial flexible interchange program. Referring to FIG. 1, an operating environment 100 can include a buyer 110, a supplier 120, an acquirer 130 that processes payments on behalf of the supplier 120, an issuer 140 providing a payment instrument on behalf of the buyer 110, and payment/transaction network(s) 150 that route(s) transaction information. An example of a payment network is the one operated by Mastercard International Incorporated, the assignee of the present disclosure. The acquirer 130 can include a processor/payment facilitator that forwards the transaction information to an appropriate payment network. The payment network routes the transaction information to the appropriate issuer (or an integrator/entity working on behalf of an issuer to process payments) 140, which manages and verifies the payment card information, and routes the authorization from the issuer 140 to the acquirer 130. The supplier 120 may complete the transaction via the acquirer 130 when the funds transfer to the supplier's financial institution. In some cases, the same entity (e.g., American Express Company) can be both the payment network and the issuer and even the acquirer as well.

Also included in the operating environment 100 is an interchange management server 160 associated with the payment/transaction network 150 that assists with authorization and settlement of payment card transactions. New fields and reason codes are presented for authorization and settlement of the transaction as part of the commercial flexible interchange program. Although the interchange management server 160 is shown separate from the payment network(s), in some cases, the interchange management server 160 may be part of one of the payment networks.

Issuer 140 and acquirer 130 opt-in to participate in transactions using the commercial flexible interchange program. Issuer 140 opts-in specific account ranges (of buyers they service) to participate in the flexible interchange program, which may be managed by the interchange management server 160. Thus, a transaction-level interchange can be leveraged by any region for any transaction where both the issuer 140 and the acquirer 130 have registered and where the interchange rate designator (IRD) indicator is activated. This indicator can be used to indicate that the transaction(s) is subject to an interchange value that is not from the conventional tables. A supplier 120 and a buyer 110 can utilize the interchange values provided for within the commercial flexible interchange program that are negotiated on their behalf (e.g., negotiated by the acquirer 130 on behalf of the supplier 120 and by the issuer 140 on behalf of the buyer 110) for one or more transactions between the two parties (e.g., of a specific single transaction, of transactions up to or above a certain dollar amount, of a certain number of transactions, for a certain period of time, or for all transactions as desired). The agreement of the parties regarding a particular interchange value can be accomplished using conventional business practices/communications or by using platforms managed by the payment network 150. In a specific implementation/execution, issuer 140 and acquirer 130 align on an interchange value (e.g., an interchange rate, an interchange amount, or a combination of both) for a specific transaction on behalf of buyer 110 and supplier 120; and issuer 140 sends payment instructions to either the supplier 120 or the acquirer 130 for payment processing. Through the described commercial flexible interchange program, this previously agreed upon interchange value can be applied with a seamless flow of payment information through to settlement (e.g., both authorization and settlement). In addition, it should be understood that while issuer and acquirer are described herein as being the participants in the commercial flexible interchange program, other entities that represent buyers and suppliers (e.g., fintech entities, payment facilitators/processors, integrators) may participate in the program to support commercial payments for buyers and suppliers.

Figure 2:
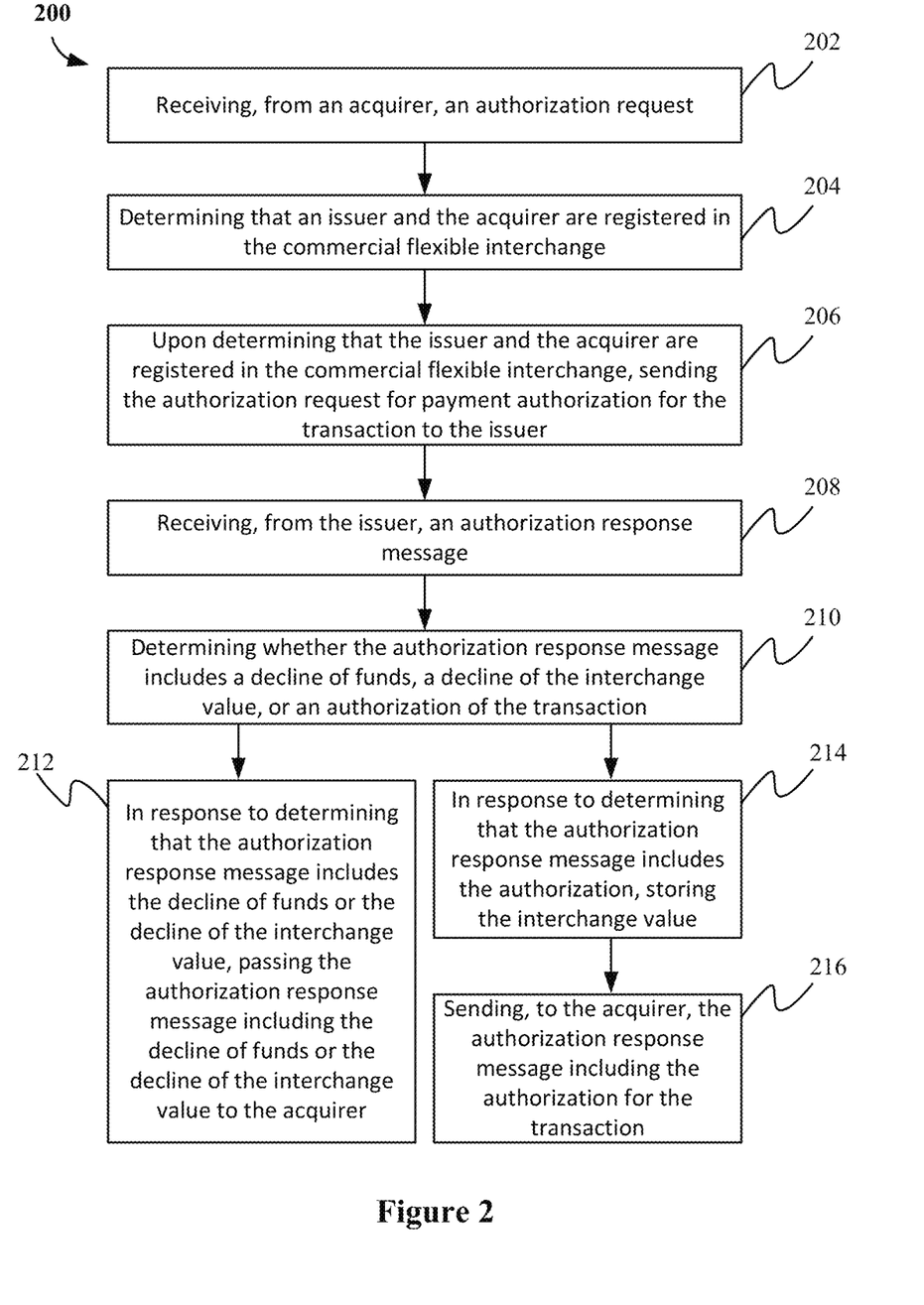
FIG. 2 illustrates a process flow for authorization of a transaction using a commercial flexible interchange program.
Figure 3A:
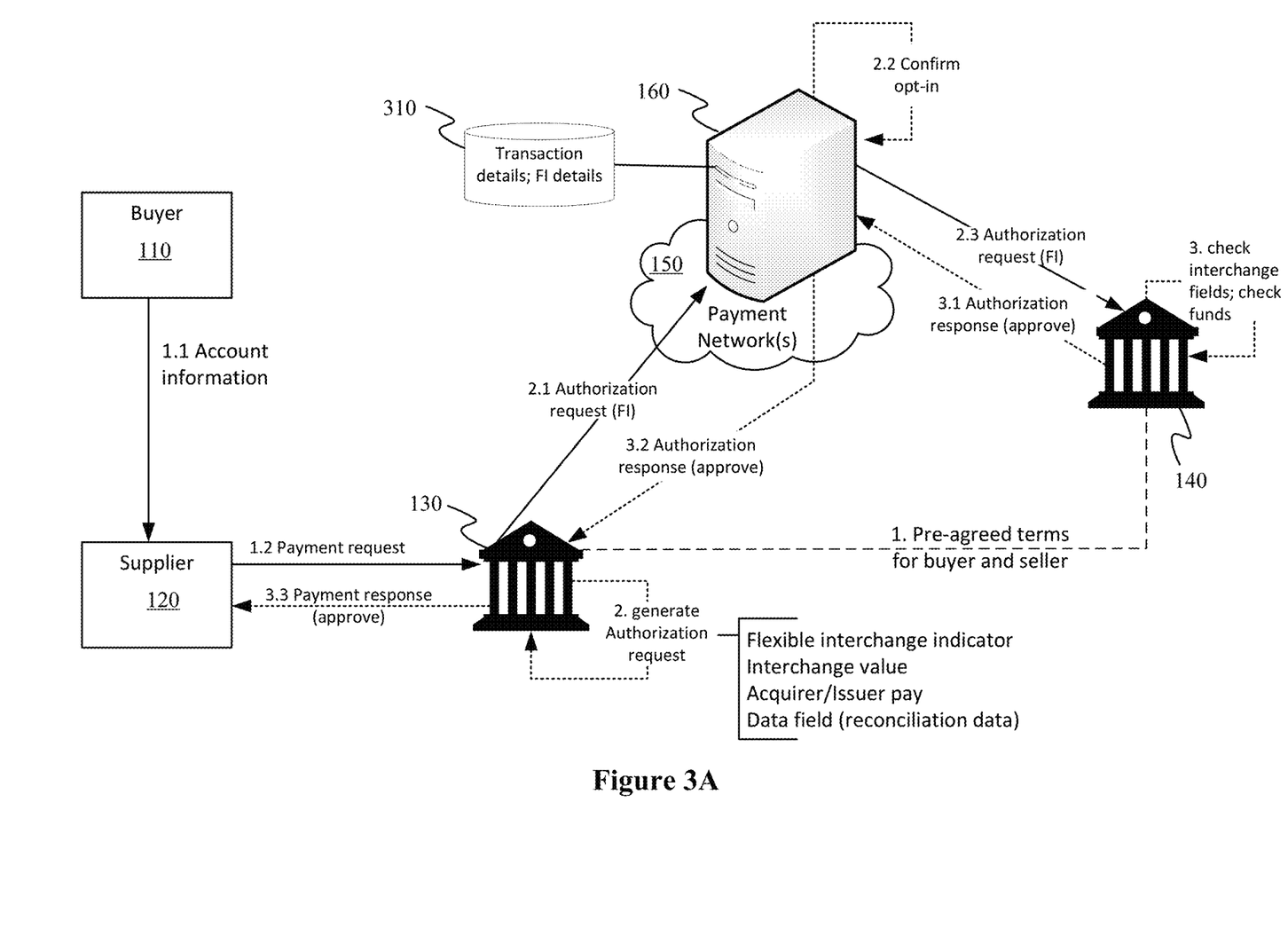
FIGS. 3A and 3B illustrate data flow for an authorization process in an operating environment for a transaction using a commercial flexible interchange program.
Figure 3B:
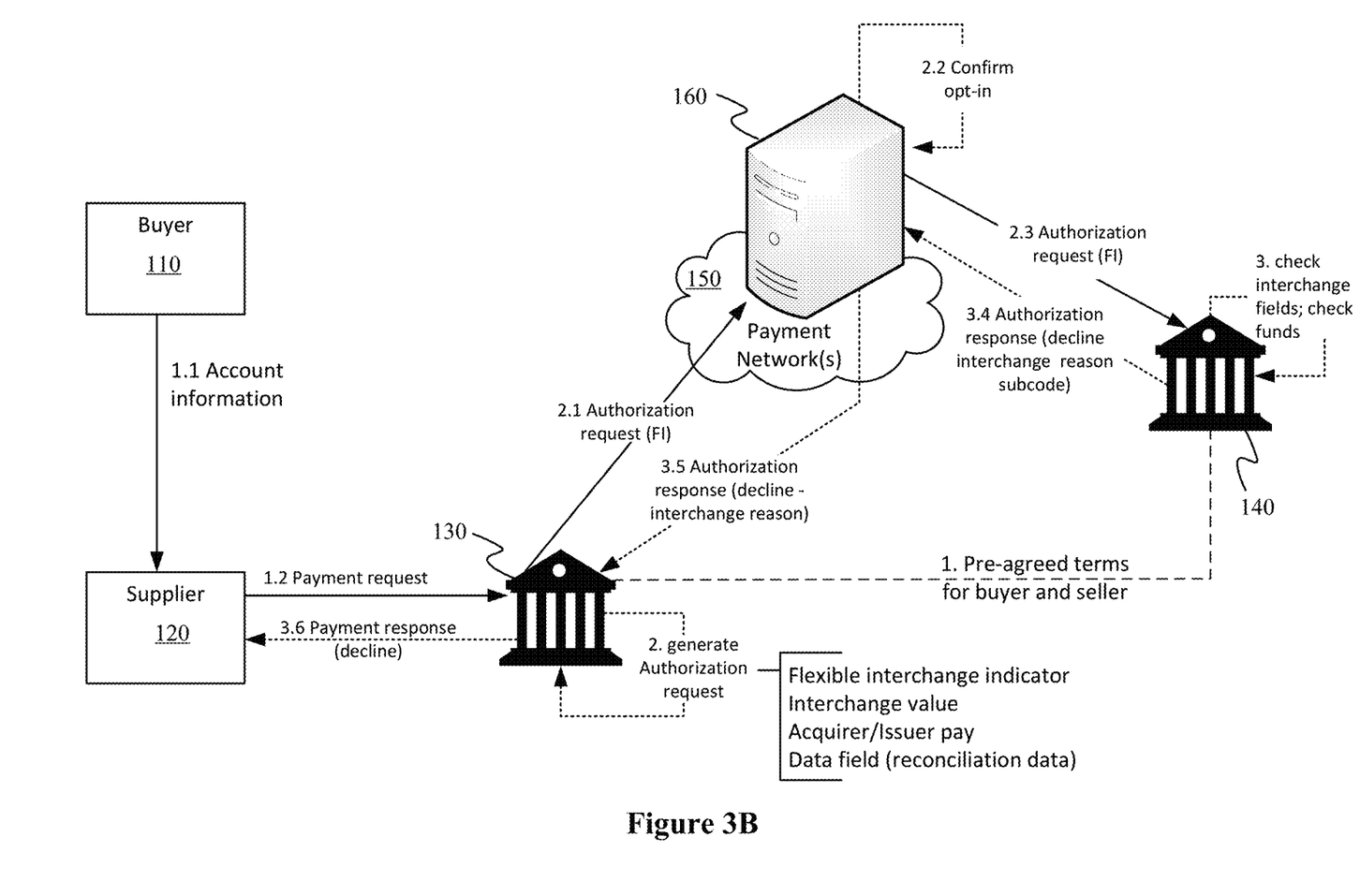

FIG. 2 illustrates a process flow for authorization of a transaction within a commercial flexible interchange program; and FIGS. 3A and 3B illustrate data flow for an authorization process in an operating environment for a transaction within a commercial flexible interchange program. FIG. 3A shows an approval of authorization for the transaction and FIG. 3B shows a decline of authorization for the transaction.

Referring to FIGS. 2, 3A, and 3B, a method 200 of providing flexibility of an interchange value in card payments via a commercial flexible interchange program includes, at interchange management server 160, receiving (202), from an acquirer 130, an authorization request for payment authorization for a transaction. The authorization request for payment authorization for the transaction includes information of an account of the buyer 110 that is associated with the issuer 140 and an interchange value.

As previously mentioned, issuer 140 and acquirer 130 (or their representatives) align on an interchange value (e.g., rate or amount or both) for a specific transaction on behalf of buyer 110 and supplier 120. Accordingly, when buyer 110 purchases product (or services) from supplier 120 and provides their payment account information (i.e., the information of the account of the buyer 110 that is associated with the issuer 140), a payment request can be made via supplier 120 through acquirer 130. For example, issuer 140 (on behalf of buyer 110) may send payment instructions to either the supplier 120 or the acquirer 130 for payment processing.

Referring to FIGS. 3A and 3B, the acquirer 130 can generate the payment authorization request for payment authorization of the transaction. After generating the authorization request, the acquirer 130 sends the authorization request to the payment network 150. Upon receiving the authorization request from the acquirer 130 and recognizing that the transaction is utilizing the commercial flexible interchange program (e.g., by checking a new flexible interchange field indicating whether the transaction is subject to the flexible interchange program), the payment network 150 passes the authorization request to the issuer 140.

The authorization request generated by the acquirer 130 can use one or more of a set of newly defined (by the flexible interchange program) and implemented flexible interchange-specific fields from the available fields within the standard format of the payment authorization message. In various implementations, four new fields are provided: a flexible interchange indicator, an interchange value, an acquirer/issuer pay field, and a data field. As mentioned above, the authorization request at least includes the information of the account of the buyer 110 that is associated with the issuer 140 and the interchange value. In some cases, at least the information of the account of the buyer 110 that is associated with the issuer 140, the flexible interchange indicator, and the interchange value are included in the authorization request.

The flexible interchange indicator can be a field in which a flag is set or not set. The flexible interchange indicator can indicate whether the transaction is subject to the flexible interchange program or if the transaction is to have conventional interchange values applied. An example interchange indicator is "Y".

The interchange value provides the amount, rate, or both the amount and rate at the agreed upon interchange. In some cases, the field for the interchange value is an identifier and/or number used to look up or otherwise generate the amount or rate. Examples of interchange values include "$50.00", "2%", and "2%+$50.00".

The acquirer/issuer pay field can be used to indicate which of the acquirer or the issuer pays the interchange fee. In some cases, the acquirer/issuer pay field is set as a default to acquirer pay unless otherwise specified by the acquirer 130 when the authorization request is generated. With the additional field regarding whether the issuer or acquirer pays the interchange fee, the commercial flexible interchange program provides the ability for either side to pay the interchange fee where existing systems automatically pass that cost on to the acquirer 130. Examples of values for the acquirer/issuer pay field include "A" for the acquirer 130 to pay and "I" for the issuer 140 to pay.

The data field can be a blank field used by acquirer 130 to convey additional information, for example, reconciliation data. This field can allow the acquirer to submit an alphanumeric identifier to help the issuer 140 associate the transaction (in authorization) with a previously negotiated interchange value. Example supplemental interchange data include "Agreement ID" or "Corporate Buyer Name."

In some cases, instead of being generated by the acquirer 130, the payment request from the supplier 120 and/or the payment instructions from the issuer 140 include the information for the one or more of the set of defined flexible interchange-specific fields.

Returning to FIG. 2, after the interchange management server 160 and/or payment network 150 receives the authorization request, the method 200 further includes determining (204) that the issuer 140 and acquirer 130 are registered in the commercial flexible interchange program. The authorization request for a transaction under the flexible interchange program can be validated by ensuring both the issuer 140 and acquirer 130 are registered (e.g., "opted-in") for the program. If either side is not registered, the interchange management server 160 rejects the proposed authorization.

Upon determining that the issuer 140 and acquirer 130 are registered in the commercial flexible interchange program, the method 200 includes sending (206) the authorization request for payment authorization for the transaction to the issuer 140. Issuer 140 recognizes the new field(s) and can, in addition to performing conventional checks for authorization, authorize or decline the transaction based on the information in the flexible interchange-specific fields. Decline reason subcodes are provided that the issuer 140 can use to provide a reason for declining the flexible interchange transaction. For example, a decline sub reason code may indicate that the interchange value is wrong/not accepted. The decline reason subcode allows the issuer 140 to use an existing "Decline Reason Code" in authorization if it does not approve the submitted interchange value and use new sub reason code.

The method 200 further includes receiving (208) from the issuer 140, an authorization response message and determining (210) whether the authorization response message includes a decline of funds for the transaction (or other conventional decline code), a decline of the interchange value for the transaction (e.g., a new decline code), or an authorization for the transaction.

Referring to FIG. 2 and FIG. 3B, in response to determining that the authorization response message includes the decline of funds for the transaction or the decline of the interchange value for the transaction, the method 200 includes passing (212) the authorization response message including the decline of funds for the transaction or the decline of the interchange value for the transaction to the acquirer 130. As mentioned above, a decline reason subcode can be received from the issuer 140 indicating the reason for declining the flexible interchange transaction.

Referring to FIG. 2 and FIG. 3A, in response to determining that the authorization response message includes the authorization for the transaction, the method 200 includes storing (214) the interchange value and sending (216), to the acquirer 130, the authorization response message including the authorization for the transaction that comprises acceptance of the interchange value for the transaction. For example, the interchange management server 160 can store the transaction details, including the information from the flexible interchange-specific fields, to a clearing system/resource 310 to be applied to a clearing record.

Figure 4:
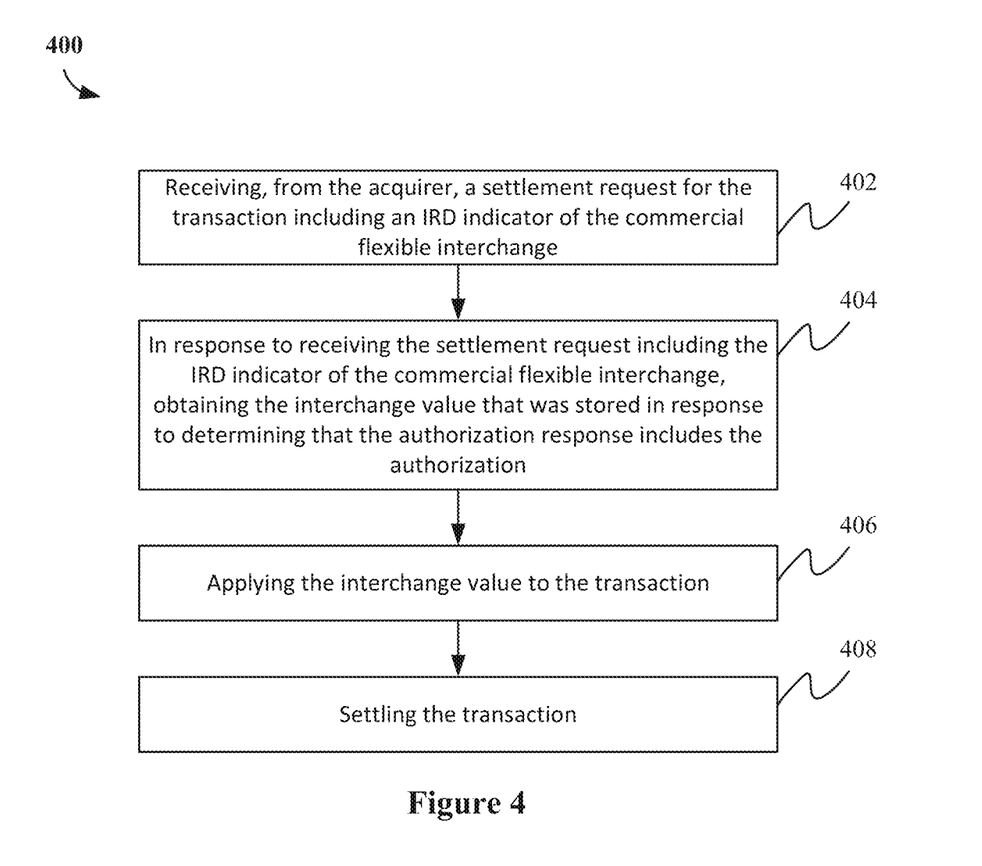
FIG. 4 illustrates a process flow for settlement of a transaction using a commercial flexible interchange program.
Figure 5:
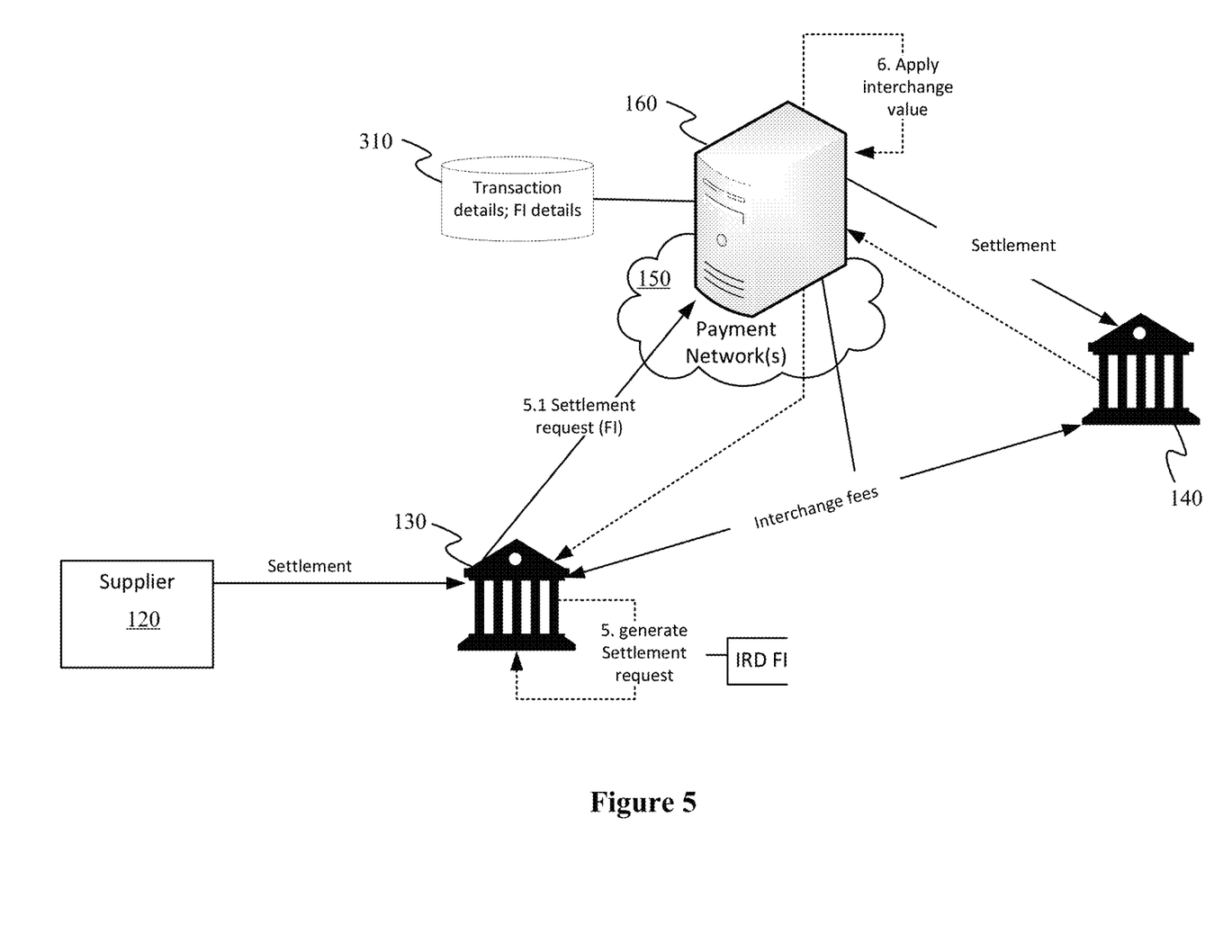
FIG. 5 illustrates a data flow for a settlement process.

FIG. 4 illustrates a process flow for settlement of a transaction within a commercial flexible interchange program; and FIG. 5 illustrates a data flow for a settlement process. Referring to FIGS. 4 and 5, a method 400 of providing a commercial flexible interchange program includes, at interchange management server 160, receiving (402), from the acquirer 130, a settlement request for the transaction including an interchange rate designator (IRD) indicator of the transaction of the commercial flexible interchange program. The acquirer 130 can generate a clearing and/or settlement request for the transaction that includes an interchange rate designator (IRD) indicator of a flexible interchange program. In some cases, the acquirer 130 sends the settlement request for the transaction to the payment network 150, which passes the settlement request on to the interchange management server 160 (e.g., upon recognizing the settlement request includes the IRD indicator).

At the interchange management server 160, the method 400 includes, in response to receiving the IRD indicator of the transaction of the commercial flexible interchange program, obtaining (404) the interchange value that was stored in response to determining that the authorization response message includes the authorization; and applying (406) the interchange value to complete settlement (408). For example, the interchange management server 160 can, triggered by receiving the IRD indicator, search the storage resource 310 storing the authorization record for the interchange value to be applied. The interchange management server 160 matches the clearing record (identified from the settlement request) against authorization using the IRD for the commercial flexible interchange program; and applies the interchange value that was initially passed in the authorization request. The IRD indicator is not required to carry the interchange value itself but can serve as a matching function. For example, the IRD indicator may be associated with the interchange value, such that the interchange value is obtainable via the storage resource 310. If there is an interchange discrepancy, for example, due to authorization not matching clearing (e.g., as identified during the operation of obtaining the interchange value), either party can use a Fee Collection Reason Code to request funds from the other party, which is another available reason code associated with the commercial flexible interchange program.

As can be seen, the flexible interchange program enables acquirers to populate interchange values within one of the new authorization fields. A new global Interchange Rate Designator (which can be referred to as "IRD FI") is available to help match the submitted rate between the authorization message and clearing record. If there is an issue with the requested interchange values, for example, due to errors in the authorization messages or in storing with transaction details, default interchange values may be used (and new fee collection reason codes are available in case corrections need to be made between acquirer and issuer).

Advantageously, by adding one or more new authorization fields described herein, negotiated interchange values (e.g., that are negotiated by the acquirer on behalf of the supplier and by the issuer on behalf of the buyer) can be applied to a transaction, allowing both buyers and suppliers benefit from the security of payment card transaction networks and the standard reconciliation data provided by payment card transaction networks.

Figure 6:
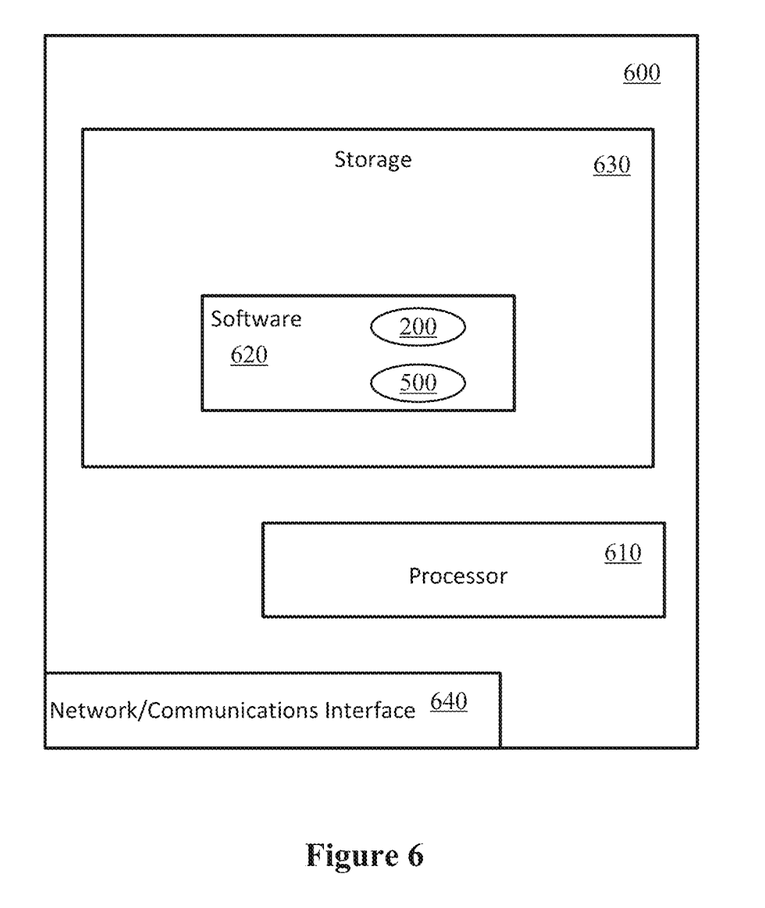
FIG. 6 illustrates a representative diagram of a computer system that may implement an interchange management server.

FIG. 6 illustrates a representative diagram of a computer system that may implement an interchange management server Referring to FIG. 6, system 600 may be implemented within a single computing device or distributed across multiple computing devices or sub-systems that cooperate in executing program instructions. The system 600 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 600 can include a processing system 610, which may include one or more processors and/or other circuitry that retrieves and executes software 620 from storage system 630. Processing system 610 may be implemented within a single processing device but may also be distributed across multiple processing devices or sub-systems that cooperate in executing program instructions.

Storage system(s) 630 can include any computer readable storage media readable by processing system 610 and capable of storing software 620 (and associated data). Storage system 630 may be implemented as a single storage device but may also be implemented across multiple storage devices or sub-systems co-located or distributed relative to each other. Storage system 630 may include additional elements, such as a controller, capable of communicating with processing system 610. Storage system 630 may also include storage devices and/or sub-systems on which data is stored. System 600 may access one or more storage resources in order to access information to carry out any of the processes indicated by software 620.

Software 620 can include routines for performing processes, such as processes 200 and/or 500 for the interchange management server as described with respect to FIGS. 2 and 5, that among other functions may, when executed by system 600 in general or processing system 610 in particular, direct the system 600 or processing system 610 to operate as described herein.

A communication interface 640 may be included, providing communication connections and devices that allow for communication between system 600 and other computing systems (not shown) over a communication network or collection of networks (not shown) or the air. System 600 can include one or more communications networks that facilitate communication among computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

In some embodiments, system 600 may host one or more virtual machines.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of providing flexibility of an interchange value in card payments via a commercial flexible interchange program implemented on an interchange management server associated with a payment card network, comprising:
   receiving, from an acquirer that is associated with a supplier, an authorization request for payment authorization for a transaction, wherein the authorization request for payment authorization for the transaction comprises a message structure having standard fields including information of an account of a buyer that is associated with an issuer and an amount for goods or services, and a specific field from the message structure for an interchange value providing an interchange amount, an interchange rate, or both that is previously agreed upon on behalf of the buyer and the supplier;
   determining that the issuer and the acquirer are registered in the commercial flexible interchange program;
   upon determining that the issuer and the acquirer are registered in the commercial flexible interchange program, sending the authorization request for payment authorization for the transaction to the issuer;
   receiving, from the issuer, an authorization response message;
   determining that the authorization response message includes an authorization for the transaction that comprises acceptance of the interchange value for the transaction;
   in response to determining that the authorization response message includes the authorization for the transaction:
      storing the interchange value; and
      sending, to the acquirer, the authorization response message that includes the authorization for the transaction;
   receiving, from the acquirer, a settlement request for the transaction comprising an interchange rate designator (IRD) indicator of the transaction of the commercial flexible interchange program;
   in response to receiving the settlement request comprising the IRD indicator of the transaction of the commercial flexible interchange program, obtaining the interchange value that was stored in response to determining that the authorization response message includes the authorization;
   applying the interchange value to the transaction; and
   settling the transaction.

2. The method of claim 1, further comprising:
   receiving, from the acquirer that is associated with the supplier, a second authorization request for payment authorization for a second transaction, wherein the second authorization request for payment authorization for the second transaction comprises information of a second account of a second buyer that is associated with the issuer and a second interchange value;
   sending the second authorization request for payment authorization for the second transaction to the issuer;
   receiving, from the issuer, a second authorization response message; and
   determining that the second authorization response message includes a decline of the interchange value for the second transaction.

3. The method of claim 2, wherein the second authorization response message includes a decline reason subcode.

4. The method of claim 2, further comprising in response to determining that the second authorization response message includes the decline of the second interchange value for the transaction, passing the authorization response message that includes the decline of the second interchange value for the second transaction to the acquirer.

5. The method of claim 1, further comprising:
   receiving an indication that the issuer desires to participate in the commercial flexible interchange program; and
   registering the issuer in the commercial flexible interchange program.

6. The method of claim 5, further comprising:
   receiving an indication that the acquirer desires to participate in the commercial flexible interchange program; and
   registering the acquirer in the commercial flexible interchange program.

7. One or more computer-readable storage media storing instructions implemented on an interchange management server associated with a payment card network that when executed by a processor directs the interchange management server to at least:
   receive, from an acquirer that is associated with a supplier, an authorization request for payment authorization for a transaction, wherein the authorization request for payment authorization for the transaction comprises a message structure having standard fields including information of an account of a buyer that is associated with an issuer and an amount for goods and services, and a specific field from the message structure for an interchange value providing an interchange amount, an interchange rate, or both that is previously agreed upon on behalf of the buyer and the supplier;
   determine that the issuer and the acquirer are registered in a commercial flexible interchange program;
   upon determining that the issuer and the acquirer are registered in the commercial flexible interchange program, send the authorization request for payment authorization for the transaction to the issuer;
   receive, from the issuer, an authorization response message;
   determine that the authorization response message includes an authorization for the transaction that comprises acceptance of the interchange value for the transaction;
   in response to determining that the authorization response message includes the authorization for the transaction:
      store the interchange value; and
      send, to the acquirer, the authorization response message that includes the authorization for the transaction;
   receive, from the acquirer, a settlement request for the transaction comprising an interchange rate designator (IRD) indicator of the transaction of the commercial flexible interchange program;
   in response to receiving the settlement request comprising the IRD indicator of the transaction of the commercial flexible interchange program, obtain the interchange value that was stored in response to determining that the authorization response message includes the authorization;
   apply the interchange value to the transaction; and
   settle the transaction.

8. The media of claim 7, wherein the instructions further direct the interchange management server to determine that the authorization response message includes a decline of the interchange value for the transaction.

9. The media of claim 8, wherein the instructions further direct the interchange management server to pass the authorization response message comprising the decline of the interchange value for the transaction to the acquirer in response to determining that the authorization response message includes the decline of the interchange value for the transaction.

10. The media of claim 8, wherein the authorization response message includes a decline reason subcode.

11. The media of claim 7, wherein the instructions further direct the interchange management server to:
receive an indication that the issuer desires to participate in the commercial flexible interchange program; and
register the issuer in the commercial flexible interchange program.

12. The media of claim 11, wherein the instructions further direct the interchange management server to:
receive an indication that the acquirer desires to participate in the commercial flexible interchange program; and
register the acquirer in the commercial flexible interchange program.

13. An interchange management server for providing flexibility of an interchange value in card payments via a commercial flexible interchange program, the interchange management server comprising:
a processor;
a storage; and
instructions stored on the storage that when executed by the processor directs the interchange management server to:
receive, from an acquirer that is associated with a supplier, an authorization request for payment authorization for a transaction, wherein the authorization request for payment authorization for the transaction comprises a message structure having standard fields including information of an account of a buyer that is associated with an issuer and an amount for goods or services, and a specific field from the message structure for an interchange value providing an interchange amount, an interchange rate, or both that is previously agreed upon on behalf of the buyer and the supplier;
determine that the issuer and the acquirer are registered in the commercial flexible interchange program;
upon determining that the issuer and the acquirer are registered in the commercial flexible interchange program, send the authorization request for payment authorization for the transaction to the issuer;
receive, from the issuer, an authorization response message;
determine that the authorization response message includes an authorization for the transaction that comprises acceptance of the interchange value for the transaction;
in response to determining that the authorization response message includes the authorization for the transaction:
store the interchange value; and
send, to the acquirer, the authorization response message that includes the authorization for the transaction;
receive, from the acquirer, a settlement request for the transaction comprising an interchange rate designator (IRD) indicator of the transaction of the commercial flexible interchange program;
in response to receiving the settlement request comprising the IRD indicator of the transaction of the commercial flexible interchange program, obtain the interchange value that was stored in response to determining that the authorization response message includes the authorization;
apply the interchange value to the transaction; and
settle the transaction.

14. The interchange management server of claim 13, wherein the instructions further direct the interchange management server to determine that the authorization response message includes a decline of the interchange value for the transaction.

15. The interchange management server of claim 14, wherein the instructions further direct the interchange management server to pass the authorization response message comprising the decline of the interchange value for the transaction to the acquirer in response to determining that the authorization response message includes the decline of the interchange value for the transaction.

16. The interchange management server of claim 13, wherein the instructions further direct the interchange management server to:
receive an indication that the issuer desires to participate in the commercial flexible interchange program; and
register the issuer in the commercial flexible interchange program.

17. The interchange management server of claim 16, wherein the instructions further direct the interchange management server to:
receive an indication that the acquirer desires to participate in the commercial flexible interchange program; and
register the acquirer in the commercial flexible interchange program.

* * * * *